Patented Mar. 17, 1953

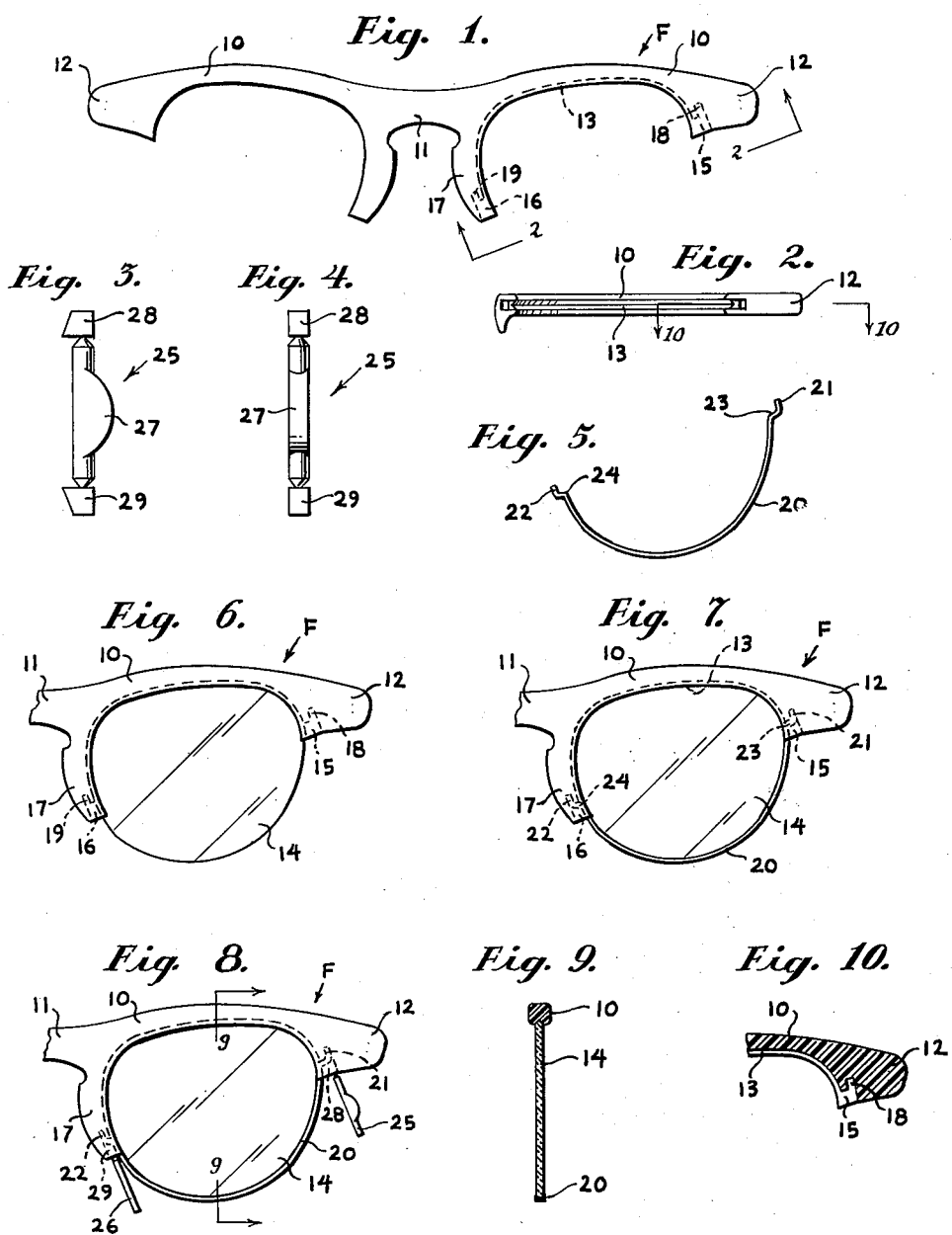

2,631,959

UNITED STATES PATENT OFFICE 2,631,959

METHOD OF ASSEMBLING LENSES IN SPECTACLE FRAMES

Albert George McNeill, Maple Glen, Pa., assignor to Bachmann Bros. Inc., Philadelphia, Pa., a corporation of Pennsylvania Application September 27, 1951, Serial No. 248,500

6 Claims. (Cl. 154—118)

The present invention relates to the manufacture of spectacles and is concerned primarily with a novel method of assembling lenses in spectacle frames.

At the present time, the manufacturers of spectacles are putting out a product which is meeting with a high degree of public acceptance. A pair of spectacles of this particular type comprises a frame that is made from an appropriate plastic material and which includes a pair of lens embracing parts, each of which is adapted to embrace only the upper portion of a lens. The frame part is provided with a groove which receives the marginal edge of the lens and a metallic retaining strip is employed in conjunction therewith to maintain the lens assembled in the frame part. This metallic strip covers that portion of the lens edge which is not embraced within the frame part and its ends are anchored to the frame part. At the present time, small screws are employed for this purpose.

The present invention is founded on the belief that the use of these screws is an undesirable feature. In the first place, they are relatively expensive and unduly complicate the assembly process. Then again, the screws being of metal result in an appearance in which the screws have a color contrasting to that of the frames. These frames are ordinarily made of a plastic having the property of transparency, to at least some degree, and the screws embedded therein are noticeable.

With the foregoing conditions in mind, the present invention has in view as its foremost objective the provision of a new and improved method of assembling the lenses in the spectacle frames.

As above explained, each frame part which receives a lens has a recess corresponding to that portion of the lens which is received therein and is formed with a groove which receives the marginal edge of the lens. Offset with respect to each end of the groove there is formed in the frame part of a socket which receives one end of the metallic strip. In accordance with the present invention, the ends of the metallic strip are offset so that after they are received in these sockets there is left a small space or recess above the offset ends.

Another highly important object of the invention is to provide, in a method of assembling a lens in a spectacle frame, the step of plugging up the recesses over the offset ends of the metallic strips and securely joining the plugs to the frame. This step of plugging up these recesses is particularly advantageous because the material from which the frames are made readily lends itself to the process. Plastics which are commonly used in the production of these frames are certain of the acetates.

By employing the same material for the plugs, a solvent for the acetate may be used to cement or join the plugs to the frames. Acetone is such a solvent which is readily available.

Due to the fact that these plugs are fairly small and considerable difficulty would ordinarily be experienced in their handling and manipulation, the invention has in mind the provision of a method in which each of the plug elements is provided with a handle. This handle facilitates dipping of the plug in acetone and insertion into the recess above the offset end of the metallic strip. After this has been accomplished, the handle may be broken off leaving the plug in position securely anchoring that end of the metallic strip.

Various other more detailed objects and advantages of the invention such as arise in connection with carrying out the above noted ideas in a practical embodiment, will in part become apparent, and in part be hereinafter stated as the description of the invention proceeds.

The invention, therefore, comprises a method of assembling a lens in a spectacle frame which consists essentially in the steps of first molding or casting the frames to provide a frame part that is shaped to embrace a portion of the lens to be received therein and which part is formed with a groove which receives the marginal edge of the lens and sockets offset with respect to the ends of the groove. The lens is next inserted in the frame part whereupon a metallic retaining strip is positioned so that it engages that portion of the edge of the lens which is not received in the frame part with the ends of the strip being received in the offset sockets. Plug elements are now dipped in a cement or solvent and inserted in the recess above the ends of the metallic strips after which the handle portion of the plug elements are broken off.

For a full and more complete understanding of the invention, reference may be had to the following description and accompanying drawing wherein:

Figure 1 is a view in front elevation looking at a spectacle frame that is used in the method of this invention.

Figure 2 is an elevational view of one frame part taken on a plane normal to the showing of Figure 1, as indicated by lines 2—2 of Figure 1.

Figure 3 is a view in side elevation of one of the plug elements.

Figure 4 is a view similar to Figure 3, but taken on a plane normal thereto.

Figure 5 is a detailed elevational view of the metallic retaining strip per se.

Figure 6 is a view in elevation showing a lense as applied to a frame part.

Figure 7 is a view similar to Figure 6 showing the next step of applying the retaining strip.

Figure 8 is another view similar to Figure 6 and 7 showing the application of the plug elements.

Figure 9 is a detailed section taken about on the plane represented by the line 9—9 of Figure 8; and Figure 10 is a detailed sectional view of the frame at the ear.

Referring now to the drawing wherein like reference characters denote corresponding parts, a spectacle frame is therein illustrated and referred to in its entirety by the reference character F. It will be understood that the frame F may be made of any of the plastics now commonly employed in the manufacture of spectacles of this type. However, it is noted that cellulose acetate is the preferred material from which the frame F is made.

The frame F includes two parts, each of which is adapted to receive a lens, and these parts are complementary to one another and, in a sense, duplicates. Hence, the method will be described in connection with only one frame part and one lens.

The frame F includes the two frame parts 10 which are joined by a nose bridge 11. At the free end remote from the nose bridge 11 there is an ear 12 which constitutes the anchorage for a temple.

The frame F is molded or cast by operations well known in this art and when so molded, is formed with a groove 13 which receives a portion of the marginal edge of a lens 14. This groove extends from a recess 15 formed in the ear 12 to a recess 16 formed in an inner side part 17.

Offset with respect to the outer end of the groove 13, the ear 12 is formed with a socket 18 immediately beneath the recess 15. Likewise, there is another socket 19 formed in the inner side part 17 in offset relation with respect to the inner end of the groove 13 and which socket 19 is in effect a continuation of the recess 16. After the core part of the mold, which is used to form groove 13, sockets 18 and 19, and recesses 15 and 16, is removed, the lens 14 is positioned so that a portion of its marginal edge is received in the groove 13.

A metallic retaining strip which is shown at 20 has offset ends 21 and 22 that are provided by shoulders 23 and 24. This retaining strip is now positioned so that its ends 21 and 22 are received in the sockets 18 and 19 respectively. In this position, the main body portion of the strip engages the lens about the edge which is not received in the groove 13.

A pair of plug elements are shown at 25 and 26. Each of these plug elements includes a handle portion such as represented at 27. It will be noted that there is a plug proper on each side of the handle 27, as indicated at 28 and 29. The plug element 25 is taken by the operator with the handle portion 27 utilized for gripping purposes. One of the plugs 28 or 29 is now dipped in an appropriate cement or solvent for the material of either the frame or plug, or both of them.

In the preferred embodiment of the invention the plug elements 25 and 26 will be made from the same material as the frame F, that is, they will be of cellulose acetate. With this material being used, one of the plugs 28 or 29 is dipped into acetone after which it is inserted in the recess 15 and broken off simply by moving the handle laterally. The same operation may now be carried out with the plug at the other side of the handle, leaving the plug in the recess 16. The operation is of course repeated for the other frame part 10 and the other lens 14.

After the solvent has set, it is evident that the plugs are integrally joined to the material of the frame part leaving a one-piece structure with the presence of the plugs being substantially unnoticeable. This means that the metallic retaining strips are securely held in position because the plugs bear directly against the shoulders 23 and 24. At the same time, a highly desirable appearance effect is afforded.

The offset ends 21 and 22 which cooperate with the sockets 18 and 19 are highly important in definitely assuring that the retaining strip will remain anchored in position. The recesses 15 and 16, with the plugs therein prevent the ends of the strip from pulling out of the frame F and the offset ends 21 and 22, being received in the sockets 18 and 19, prevent the frame F from warping away from the metal strip.

While a preferred specific embodiment of the invention is hereinbefore set forth, it is to be clearly understood that the invention is not to be limited to the exact steps and materials illustrated and described because various modifications of these details may be provided in putting the invention into practice within the purview of the appended claims.

I claim:

1. In the manufacture of spectacles, the method of assembling a lens in a spectacle frame which includes the steps of: (a) molding a spectacle frame from a plastic to provide a lens receiving frame part having an inner side and an outer ear with a groove extending therebetween and a socket having a closed end offset with respect to each end of said groove, there being a recess in said ear over the socket therein and communicating therewith and a recess in said inner side over the socket therein and communicating therewith, (b) inserting a lens in said frame part with a portion of the marginal edge thereof being received in said groove, (c) positioning a metallic retaining strip having offset ends about that portion of the edge of said lens that is not received in said groove with the offset ends being received in said sockets, (d) applying an adhesive to a pair of plugs, and (e) inserting said plugs with the adhesive thereon into said recesses.

2. In the manufacture of spectacles, the method of assembling a lens in a spectacle frame which includes the steps of: (a) molding a spectacle frame from a plastic to provide a lens receiving frame part having an inner side and an outer ear with a groove extending therebetween and a socket having a closed end offset with respect to each end of said groove, there being a recess in said ear over the socket therein and communicating therewith and a recess in said inner side over the socket therein and communicating therewith, (b) inserting a lens in said frame part with a portion of the marginal edge thereof being received in said groove, (c) positioning a metallic retaining strip having offset ends about that portion of the edge of said lens that is not received in said groove with the offset ends being received in said sockets, (d) applying an adhesive to the plug portions of plug elements including handles, (e) inserting said plug portions with the adhesive thereon into said recess, and (f) breaking off said handles leaving the plugs inserted in the recesses.

3. In the manufacture of spectacles, the method of assembling a lens in a spectacle frame which includes the steps of: (a) molding a spectacle frame from plastic, that is soluble in certain solvents, to provide a lens receiving frame part having an inner side and an outer ear with a groove extending therebetween and a socket having a closed end offset with respect to each end of said groove, there being a recess in said ear over the socket therein and a recess in said inner side over the socket therein, (b) inserting a lens in said frame part with a portion of the marginal edge thereof being received in said groove, (c) positioning a metallic retaining strip having offset ends about that portion of the edge of said lens that is not received in said groove with the offset ends being received in said sockets, (d) dipping a pair of plugs of the same material as said frame in a solvent therefore, and (e) inserting said plugs in said recesses.

4. In the manufacture of spectacles, the method of assembling a lens in a spectacle frame which includes the steps of: (a) molding a spectacle frame from a plastic, that is soluble in certain solvents, to provide a lens receiving frame part having an inner side and an outer ear with a groove extending therebetween and a socket having a closed end offset with respect to each end of said groove, there being a recess in said ear over the socket therein and a recess in said inner side over the socket therein, (b) inserting a lens in said frame part with a portion of the marginal edge thereof being received in said groove, (c) positioning a metallic retaining strip having offset ends about that portion of the edge of said lens that is not received in said groove with the offset ends being received in said sockets, (d) dipping the plug portions of a pair of plug elements of the same material as said frame in a solvent therefor, said plug elements having handles, (e) inserting said dipped lugs in said recesses, and (f) breaking off said handles.

5. In the manufacture of spectacles, the method of assembling a lens in a spectacle frame which includes the steps of: (a) molding a spectacle frame from a cellulose acetate to provide a lens receiving frame part having an inner side and an outer ear with a groove extending therebetween and a socket having a closed end offset with respect to each end of said groove, there being a recess in said ear over the socket therein and a recess in said inner side over the socket therein, (b) inserting a lens in said frame part with a portion of the marginal edge thereof being received in said groove, (c) positioning a metallic retaining strip having offset ends about that portion of the edge of said lens that is not received in said groove with the offset ends being received in said sockets, (d) dipping a pair of cellulose acetate plugs in acetone, and (e) inserting said dipped plugs in said recesses.

6. In the manufacture of spectacles, the method of assembling a lens in a spectacle frame which includes the steps of: (a) molding a spectacle frame from a cellulose acetate to provide a lens receiving frame part having an inner side and an outer ear with a groove extending therebetween and a socket having a closed end offset with respect to each end of said groove, there being a recess in said ear over the socket therein and a recess in said inner side over the socket therein, (b) inserting a lens in said frame part with a portion of the marginal edge thereof being received in said groove, (c) positioning a metallic retaining strip having offset ends about that portion of the edge of said lens that is not received in said groove with the offset ends being received in said sockets, (d) dipping the plug portions of a pair of cellulose acetate plug elements having handles in acetone, (e) inserting the dipped plug portions in said recesses, and (f) breaking off said handles.

ALBERT GEORGE McNEILL.

REFERENCES CITED

The following references are of record in the file of this patent:

UNITED STATES PATENTS

| Number | Name | Date |
|---|---|---|
| 1,721,170 | Wrighton | July 16, 1929 |
| 2,269,037 | Oker | Jan. 6, 1942 |
| 2,300,834 | Spooner | Nov. 3, 1942 |
| 2,516,549 | Chappell | July 25, 1950 |